United States Patent Office 3,542,831
Patented Nov. 24, 1970

3,542,831
HIGHER ALKYL CONTAINING METHYLPHENYL-ACETOXYSILANES
William G. Gowdy, Old Bridge, N.J., assignor to Dow Corning Corporation, Midland, Mich., a corporation of Michigan
No Drawing. Filed Aug. 15, 1968, Ser. No. 752,781
Int. Cl. C07f 7/08, 7/18
U.S. Cl. 260—448.2     3 Claims

ABSTRACT OF THE DISCLOSURE

Akylmethylphenylacetoxysilanes wherein the alkyl radical contains from 16 to 45 carbon atoms are disclosed which find utility as evaporation retardants. An example of an alkylmethylphenylacetoxysilane is n-octadecylmethylphenylacetoxysilane.

---

This invention relates to an alkylmethylphenylacetoxysilane.

A number of acetoxysilanes are known, such as those described in U.S. Pat. No. 2,405,988. These acetoxysilanes such as dodecyl-di-phenyl-silicon acetate are described and are useful as treating agents to make cellulosic materials water repellent.

An object of this invention is to provide a new class of acetoxysilanes which are useful for retarding the evaporation of water.

This invention relates to an alkylmethylphenylacetoxysilane of the formula $$(C_nH_{2n+1})\underset{\underset{CH_3}{|}}{\overset{\overset{C_6H_5}{|}}{Si}}O-\overset{\overset{O}{\|}}{C}CH_3$$

wherein $n$ has a value from 16 to 45 inclusive.

The alkylmethylphenylacetoxysilanes of this invention can best be prepared by reacting an α-olefin with methylphenylchlorosilane in the presence of a platinum catalyst such as chloroplatinic acid. A compound of the formula $(C_nH_{2n+1})(C_6H_5)(CH_3)SiCl$ is obtained. This resulting chlorosilane is then reacted with sodium acetate to produce the alkylmethylphenylacetoxysilanes of this invention.

The α-olefin can be any alkene which has a carbon-carbon double bond at a terminal carbon atom and has 16 to 45 carbon atoms. The α-olefins can be either straight chained or branched and include, for example, α-hexadecene, α-oceadecene, α-nonadecene $$CH_2=CH(CH_2)_{20}CH_3$$
$$CH_2=CH(CH_2)_7(CH_3)(CH_2)_6CH_3$$
$$CH_2=CH(CH_2)_{42}CH_3$$
$$CH_2=CH(CH_2)_{21}CH_3$$
$$CH_2=CH(CH_2)_{10}CH(CH_3)(CH_2)_3-$$
$$C(CH_3)_2(CH_2)_6CH_3$$
$$CH_2=CH(CH_2)_{17}CH_3$$

and $$CH_2=CH(CH_2)_{19}CH_3$$

The alkylmethylphenylacetoxyoxysilanes of the present invention include, for example, n-hexadecylmethylphenylacetoxysilane, n-heptadecylmethylphenylacetoxysilane, n-octadecylmethylphenylacetoxysilane, n-nonadecylmethylphenylacetoxysilane, n-eicosylmethylphenylacetoxysilane, n-docosylmethylphenylacetoxysilane, n-tetracontylmethylphenylsilane $$CH_3\overset{\overset{O}{\|}}{C}O\underset{\underset{CH_3}{|}}{\overset{\overset{C_6H_5}{|}}{Si}}CH_2CH_2(CH_2)_7\overset{\overset{CH_3}{|}}{C}H(CH_2)_6CH_3$$

$$CH_3\overset{\overset{O}{\|}}{C}O\underset{\underset{CH_3}{|}}{\overset{\overset{C_6H_5}{|}}{Si}}CH_2(CH_2)_{43}CH_3,$$

$$CH_3\overset{\overset{O}{\|}}{C}O\underset{\underset{CH_3}{|}}{\overset{\overset{C_6H_5}{|}}{Si}}CH_2CH\overset{(CH_2)_9CH_3}{\underset{(CH_2)_9CH_3}{<}}$$

$$CH_3\overset{\overset{O}{\|}}{C}O\underset{\underset{CH_3}{|}}{\overset{\overset{C_6H_5}{|}}{Si}}CH_2(CH_2)_{22}CH_3,\text{ and}$$

$$CH_3\overset{\overset{O}{\|}}{C}O\underset{\underset{CH_3}{|}}{\overset{\overset{C_6H_5}{|}}{Si}}CH_2(CH_2)_{11}\underset{\underset{CH_3}{|}}{\overset{\overset{CH_3}{|}}{C}}H(CH_2)_3\overset{\overset{CH_3}{|}}{C}(CH_2)_6CH_3$$

The alkylmethylphenylacetoxysilanes of the present invention are particularly useful as evaporation retardants. The alkylmethylphenylacetoxysilanes are applied to the surface of an aqueous body which is exposed to a gaseous atmosphere. The amount of alkylmethylphenylacetoxysilane applied is determined by several factors, such as temperature of the aqueous body, temperature of the atmosphere above the aqueous body, the movement of the atmosphere or the aqueous body. The amount of the alkylmethylphenylacetoxysilane is usually applied to provide at least a monomolecular layer on the aqueous surface. Mowever, more or less can be used depending upon the desired result. If one desires to control the rate of evaporation, one can apply less of the alkylmethylphenylacetoxysilane to provide some specific rate of evaporation which can be used as a means of controlling the temperature of an aqueous body.

The aqueous body can be a swamp, a field covered with water, a pond, a lake, a reservoir, or in a tank, in a ditch, in a dish, in a closed container with a controlled atmosphere and the like.

The alkylmethylphenylacetoxysilane can be applied to the aqueous body as is or in the form of an organic solution or by any other means suitable to disperse the compound over the aqueous surface.

The following examples are illustrative only and should not be construed as limiting the invention which is properly delineated in the appended claims.

EXAMPLE 1

A flask was charged with 45.0 g. of octadecene and two drops of chloroplatinic acid. The resulting mixture was stirred and heated to 125° C., then 28.0 g. of methylphenylmonochlorosilane was slowly added. The resulting mixture was stirred and then allowed to cool. The product obtained was $$C_{18}H_{37}\underset{\underset{CH_3}{|}}{\overset{\overset{C_6H_5}{|}}{Si}}Cl$$

in a yield of 72 grams.

To 36 grams of the octadecylmethylphenylchlorosilane was added 150 g. of a solution of 5 weight percent sodium acetate in acetic acid. This mixture was heated at 50° C. for ten minutes. A white precipitate of sodium chloride formed and was removed by filtration. The remaining mixture was allowed to stand and it separated into two phases. The top phase was the product phase. The top phase was decanted and then stripped at 175°

C. for one hour under reduced pressure. The product obtained was

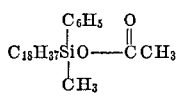

A 10 weight percent solution of the octadecylmethylphenylacetoxysilane in diethyl ether was prepared. Ten drops of this ether solution was placed on the surface of 100 g. of tap water in a 250 ml. stainless steel cup. The resulting assembly was placed in a controlled atmosphere of 65% relative humidity and 68° F. The weight of the cup, water and ether solution was initially made and then observed at time intervals of 2 days, 5 days and 7 days. A control cup was also placed in the controlled atmosphere. The control was prepared as above, but without the octadecylmethylphenylacetoxysilane solution. A solution was prepared as described above except octadecylmethylphenylchlorosilane was used in place of the octadecylmethylphenylacetoxysilane. This was used as a comparison to show the unique properties of the alkylmethylphenylacetoxysilanes.

The results below are the weight percentage of water lost in a given period under the test conditions.

| Compound | Percent water loss after— | | | Percent savings over control |
|---|---|---|---|---|
| | 2 days | 5 days | 7 days | |
| Control | 14.7 | 35.0 | 47.2 | |
| $C_{18}H_{37}\underset{\underset{CH_3}{|}}{\overset{\overset{C_6H_5}{|}}{Si}}O-\overset{\overset{O}{\|}}{C}CH_3$ | 4.9 | 18.8 | 29.4 | 37.7 |
| $C_{18}H_{37}\underset{\underset{CH_3}{|}}{\overset{\overset{C_6H_5}{|}}{Si}}Cl$ | 26.7 | 57.0 | 74.0 | −56.8 |

EXAMPLE 2

When the following olefins are reacted with $$(C_6H_5)(CH_3)HSiCl$$

in the presence of chloroplatinic acid and then contacted with sodium acetate as described in Example 1, the products as shown in the following table are obtained.

| Olefin | Product |
|---|---|
| $CH_2=CH(CH_2)_{25}CH_3$ | $CH_3\overset{\overset{O}{\|}}{C}O\underset{\underset{CH_3}{|}}{\overset{\overset{C_6H_5}{|}}{Si}}(CH_2)_{28}CH_3$ |
| $CH_2=CH(CH_2)_{13}CH_3$ | $CH_3\overset{\overset{O}{\|}}{C}O\underset{\underset{CH_3}{|}}{\overset{\overset{C_6H_5}{|}}{Si}}(CH_2)_{15}CH_3$ |
| $CH_2=CH(CH_2)_{42}CH_3$ | $CH_3\overset{\overset{O}{\|}}{C}O\underset{\underset{CH_3}{|}}{\overset{\overset{C_6H_5}{|}}{Si}}(CH_2)_{44}CH_3$ |
| $CH_2=C[(CH_2)_9CH_3]_2$ | $CH_3\overset{\overset{O}{\|}}{C}O\underset{\underset{CH_3}{|}}{\overset{\overset{C_6H_5}{|}}{Si}}CH_2CH[(CH_2)_9CH_3]_2$ |

That which is claimed is:
1. An alkylmethylphenylacetoxysilane of the formula

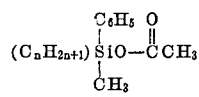

wherein $n$ has a value from 16 to 45 inclusive.
2. The alkylmethylphenylacetoxysilane according to claim 1 wherein $n$ has a value from 18 to 26 inclusive.
3. The alkylmethylphenylacetoxysilane according to claim 2 wherein $n$ is 18.

References Cited

UNITED STATES PATENTS 2,405,988   8/1946   Barry.

TOBIAS E. LEVOW, Primary Examiner

P. F. SHAVER, Assistant Examiner

U.S. Cl. X.R.

260—448.8